(12) United States Patent
Tomizawa et al.

(10) Patent No.: US 6,913,536 B2
(45) Date of Patent: Jul. 5, 2005

(54) GAME MACHINE AND PROGRAM THEREFOR

(75) Inventors: Toshikazu Tomizawa, Kyoto (JP); Nobuo Matsumiya, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 380 days.

(21) Appl. No.: 09/986,647

(22) Filed: Nov. 9, 2001

(65) Prior Publication Data

US 2002/0137566 A1 Sep. 26, 2002

(30) Foreign Application Priority Data

Mar. 23, 2001 (JP) ........................................ 2001-085540

(51) Int. Cl.⁷ ................................................ A63F 13/00
(52) U.S. Cl. .......................... 463/43; 463/23; 463/40; 463/30; 463/31; 463/32
(58) Field of Search ............................. 463/23, 37, 43, 463/40, 30, 31, 32, 307 A, 250, 253, 1–8; 700/249; 434/307 A; 273/121 B

(56) References Cited

U.S. PATENT DOCUMENTS

| | | | | |
|---|---|---|---|---|
| 4,366,960 A | * | 1/1983 | Bromley et al. ............... | 463/8 |
| 4,395,760 A | * | 7/1983 | Soski et al. ..................... | 463/3 |
| 4,657,247 A | * | 4/1987 | Okada .......................... | 463/23 |
| 4,752,069 A | * | 6/1988 | Okada .......................... | 463/23 |
| 4,837,734 A | * | 6/1989 | Ichikawa et al. ........... | 700/249 |
| 5,249,735 A | * | 10/1993 | Sander et al. ................ | 228/183 |
| 5,454,723 A | * | 10/1995 | Horii ....................... | 434/307 A |
| 5,683,082 A | * | 11/1997 | Takemoto et al. ....... | 273/121 B |
| 5,993,315 A | * | 11/1999 | Strider et al. .................. | 463/1 |
| 6,227,968 B1 | * | 5/2001 | Suzuki et al. .................. | 463/7 |
| 6,402,619 B1 | * | 6/2002 | Sato ............................ | 463/43 |
| 6,471,584 B1 | * | 10/2002 | Wada et al. .................... | 463/4 |
| 6,500,065 B1 | * | 12/2002 | Sato ............................. | 463/4 |
| 6,572,478 B2 | * | 6/2003 | Miyamoto et al. ........... | 463/43 |
| 6,582,309 B2 | * | 6/2003 | Higurashi et al. ........... | 463/31 |
| 6,585,593 B1 | * | 7/2003 | Okano et al. ................. | 463/31 |
| 6,638,160 B2 | * | 10/2003 | Yoshitomi ...................... | 463/7 |
| 6,659,873 B1 | * | 12/2003 | Kitano et al. ................. | 463/42 |

FOREIGN PATENT DOCUMENTS

| | | | | |
|---|---|---|---|---|
| JP | 08-305356 | | 11/1996 | |
| JP | A-8-3035356 | * | 11/1996 | ............ G10H/1/00 |
| JP | 09-253335 | | 9/1997 | |
| JP | A-9-253335 | * | 9/1997 | ............ A63F/9/22 |
| JP | 409253335 | * | 9/1997 | ............ A63F/9/22 |
| JP | 2000-157723 | | 6/2000 | |
| JP | 2001-170354 | | 6/2001 | |
| JP | A-2001-170354 | * | 6/2001 | ............ A63F/13/00 |
| JP | 2001-198360 | | 7/2001 | |
| JP | A-2001-198360 | * | 7/2001 | ............ A63F/13/00 |

* cited by examiner

*Primary Examiner*—John M. Hotaling, II
*Assistant Examiner*—Yveste Cherubin
(74) *Attorney, Agent, or Firm*—Nixon & Vanderhye P.C.

(57) ABSTRACT

Game machines automatically change the difficulty level of the game operation in the middle of the game based on an evaluation made on a player's game operation. A game machine determines, at least in terms of timing and type, whether the player's inputted button operation matches with the button operation designated by the game. If there is a match, the game machine determines it as an operation success. If not, the game machine determines it as an operation error. Based on the degree of operation success or operation error, the game machine dynamically changes the difficulty level of the game operation in the middle of the game.

27 Claims, 9 Drawing Sheets

| TIMING NUMBER | 1 | 2 | 3 | 4 | 5 | 6 | 7 | 8 | 9 | 10 | 11 | 12 | 13 | 14 | 15 | 16 | 17 | ··· | E |
|---|---|---|---|---|---|---|---|---|---|---|---|---|---|---|---|---|---|---|---|
| A, B BUTTON DATA | A | B | | A | A | | A | B | A | | | A | | A | B | B | | ··· | A |
| CROSS KEY DATA | | ↓ | | → | ↑ | | | → | ↓ | | | ← | | | | ← | | ··· | ↓ |

1 BAR (under columns 1–4)

F I G. 1 2
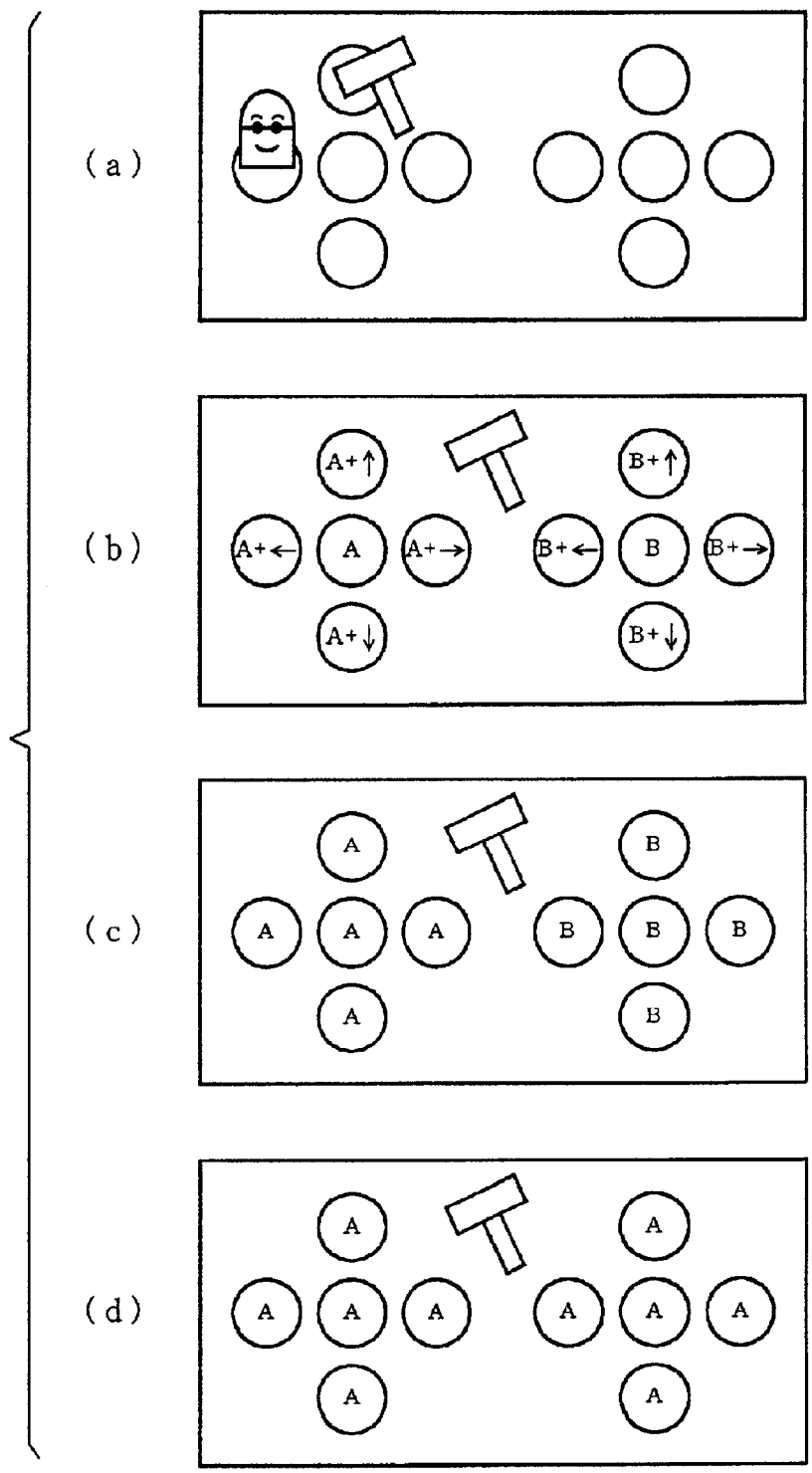

GAME MACHINE AND PROGRAM THEREFOR

BACKGROUND

1. Field

The technology described herein relates to game machines and programs therefor and, more specifically, to game machines for evaluating a player's operation based on his/her response to prompts in games (preferably music games), and in accordance with the evaluation, changing a difficulty level of the game operation, and game programs/game control programs executed in such game machines.

2. Description of Background Art

This type of conventional game machine has been disclosed, for example, in the Japanese Patent Laid-Open Publication No. 2000-157723. In such a game machine, a player selects a difficulty level of a game before starting the game. Here, if the difficulty level selected by the player is low, an operation relevant to a specific operation button is skipped from the game contents.

In the conventional technique described in the above publication, however, the difficulty level to the selected prior to the game is non-changeable during the game. Therefore, if the player's selected difficulty level does not match his/her actual competence, the player has to continue until the end of a game which is too difficult or too easy for him/her. Moreover, the player himself/herself makes the selection of difficulty levels. If the player therefore does not correctly recognize his/her own competence, he/she may not appropriately set the difficulty level.

Also, in the conventional technique described in the above publication, an operation relating to a certain operation button is skipped from the game contents if a low difficulty level is selected. In this case, the operation itself is skipped (i.e., an operation timing is not provided) so that a difference in operation timing occurs between the general difficulty level (or high difficulty level) and the low difficulty level. There thus arises a problem that playing with the low difficulty level hardly provides training for the general difficulty level (or high difficulty level).

SUMMARY OF EXEMPLARY NONLIMITING EMBODIMENTS

Therefore, aspect of the exemplary nonlimiting embodiments is to provide game machines for automatically changing, based on an evaluation made on a player's game operation, the difficulty level of the game operation in the middle of the game instead of having the difficulty level be non-changeably selected by the player, and programs therefor.

Further, another aspect of the exemplary nonlimiting embodiments is to provide game machines in which an operation timing is not changed (neither increased nor decreased) even if the difficulty level is changed so that the game contents remain the same between the low difficulty level and the general difficulty level (or high difficulty level), and programs therefor.

A first aspect of the exemplary nonlimiting embodiments is directed to a game machine for executing a predetermined game in response to a player's operation, and the game machine comprises a display section, operation switches, an operation pattern data storage section, a display control section, an evaluation section, and a difficulty level change section.

The display section displays a game screen. The operation switches are operated by the player. The operation pattern data storage section stores operation pattern data including operation timing data defining an operation timing of the operation switches to be operated by the player, and operation type data defining which type of the operation switches is to be operated with the operation timing. The display control section enables the display section to sequentially display, based on the operation pattern data, information about the operation timings and the types of the operation switches to be operated by the player. The evaluation section successively evaluates, with the progress of the game, correlation between the operation timings and types of the operation switches operated by the player responding to the information displayed on the display section, and the operation timings and types defined by the operation pattern data. The difficulty level change section dynamically changes a difficulty level of a game operation input in accordance with the evaluation made by the evaluation section for a predetermined period.

As described above, in the first aspect, the difficulty level of the game operation input can be changed in the middle of the game responsive to the evaluation made on the game play contents for a predetermined period. That is, the difficulty level can be changed responsive to the player's actual competence (here, if the predetermined period for evaluation is set shorter, the resultant evaluation can immediately be reflected in the difficulty level). Especially, by lowering the difficulty level automatically, even an unskilled player can enjoy the game until the game's end, and also can get skilled step by step. On the other hand, by increasing the difficulty level automatically, even the skilled player can enjoy the game without getting bored, and also the difficulty level can always be set appropriately corresponding to his/her improvement. Moreover, the player has no need to set his/her difficulty level so that the difficulty level can always be automatically changed to be appropriate even if he/she does not recognize his/her actual level.

The game machine further comprises music data storage section for storing music data, a music data reproduction section for reproducing the music data, and a presentation effect generation section for generating a predetermined presentation effect responding to how the operation switches are operated. By previously storing operation pattern data which corresponds to music data in the operation pattern data storage section, the operation pattern data defines which type of the operation switches is to be operated by the player with what timing. The display control section will thus enable the display section to sequentially displayed the information about the operation timings and the types of the operation switches to be operated by the player responding to the music data reproduced by the music data reproduction section.

In this manner, the game machine of the first aspect can provide a fun music game.

Alternatively, the difficulty level of the game operation input can be changed: by the difficulty level change section skipping the operation type data or canceling the skip, partially or entirely, and controlling the display control section to perform display control and the evaluation section to perform evaluation; by skipping the operation type data or canceling the skip, partially or entirely, and controlling the evaluation section to perform evaluation; by changing the operation type data in the operation pattern data or canceling the change, partially or entirely, and controlling the display control section to perform display control and the evaluation section to perform evaluation; or by controlling the display control section to have the display section displayed the operation timings and the types defined by the operation pattern data in a different tempo.

By changing the number or the type of the operation switches to be used, or by varying the music tempo, the operability of the game is changed. The difficulty level can thus be changed without affecting the game contents.

In this case, the difficulty level change section skips the operation type data responding to the evaluation being poor, controls the display control section to enable the display section to provide a display, and controls the evaluation section to perform evaluation only in terms of the correlation between the operation timings of the operation switches operated by the player and the operation timings defined by the operation pattern data. Alternatively, responding to the evaluation being poor, the operation type data defining a specific type of operation switches may be changed to data of any other type of operation switches which are easier to operate, and the display control section may be so controlled as to enable the display section to provide a display, and the evaluation section can be controlled to evaluate the correlation between the operation timings and the types of operation switches operated by the player and the operation timings defined by the operation pattern data and the types of changed operation switches.

With the low difficulty level, the operation (operation timing) remains as it is so that the operation timing does not differ between the general difficulty level (or high difficulty level) and the low difficulty level. Therefore, the player can learn the operation timing with the low difficulty level, and be ready for the general difficulty level (or high difficulty level). That is, the player first learns the operation timing, and then learns what type of operation switches he/she is supposed to operate. As such, the player can learn how to play the music step by step.

Alternatively, in the case where the operation type data defines that a plurality of types of the operation switches are to be operated simultaneously, and in response to the evaluation being poor, the difficulty level change section can skip the data relating at least to one type of the operation switches out of the plurality of types of the operation switches to be operated simultaneously, and control the display control section to provide a display and the evaluation section to perform evaluation.

If the game requires simultaneous operation switches to be pressed, the operation switches needed to be pressed simultaneously may be limited in number when the difficulty level is low (or limited to only one operation switch). In this manner, the difficulty level can be changed.

The presentation effect generation section may always generates the presentation effect corresponding to the types of operation switches defined by the operation pattern data irrespective of the control by the difficulty level change section.

In this manner, the presentation effects remain the same no matter what difficulty level. Therefore, even an unskilled player can enjoy the game as much as skilled players. Furthermore, if the game has harmonious adjustment in presentation effects among a plurality of game machines, the presentation effects will remain the same even if the difficulty level varies among those game machines. Convenient and consistent game play can therefore be provided.

Preferably, when the operation timings and types of operation switches operated by the player coincide with the operation timings and types defined by the operation pattern data, the evaluation section increases a game score and differs the increase of the game score according to the difficulty level.

By controlling the game score based on the operation contents and the difficulty level, the game can provide even greater enjoyment.

A second aspect of the exemplary nonlimiting embodiments is directed to a program for controlling the game executed in a game machine such as that described above in the first aspect. The program comprises a reading step, a displaying step, an evaluating step, and a changing step.

In the reading step, predetermined operation pattern data is read including the reading of operation timing data defining an operation timing of operation switches to be operated by a player, and operation type data defining which type of the operation switches is to be operated with the operation timing. In the displaying step, based on the operation pattern data, information about the operation timings and the types of the operation switches to be operated by the player is sequentially displayed on the display section of the game machine. In the evaluating step, based on the progress of the game, correlation between the operation timings and types of operation switches operated by the player responding to the information displayed on the display section, and the operation timings and types defined by the operation pattern data is successively evaluated. In the changing step, a difficulty level of a game operation input is dynamically changed in accordance with the evaluation made by the evaluation section for a predetermined period.

In order to apply this program of the second aspect to a music game, an exemplary embodiment may include a music data reading step, a reproducing step, a generating step, a reading step, a displaying step, an evaluating step, and a changing step.

In the music data reading step, predetermined music data is read. In the reproducing step, the music data is reproduced. In the generating step, a predetermined presentation effect is generated responding to a player's operation of the operation switches, In the reading step, predetermined operation pattern data including data corresponding to the music data is read. The read data includes operation timing data defining an operation timing of operation switches to be operated by the player, and operation type data defining which type of the operation switches is to be operated with the operation timing. In the displaying step, based on the operation pattern data, information about the operation timings and the types of the operation switches to be operated by the player corresponding to reproduction of the music data is sequentially displayed on the display section of the game machine. In the evaluating step, based on the progress of the game, correlation between the operation timings and types of the operation switches operated by the player responding to the information displayed on the display section, and the operation timings and types defined by the operation pattern data is successively evaluated. In the changing step, a difficulty level of a game operation input is dynamically changed in accordance with the evaluation made by the evaluation section for a predetermined period.

In response to an instruction made in the changing step, the operation type data may be skipped or the skip cleared partially or entirely, and the displaying step may perform display control and the evaluating step may perform evaluation. Alternatively, in response to the instruction made in the changing step, the evaluating step may evaluate the operation type data which is skipped or skipped and cleared partially or entirely. Alternatively, in response to the instruction made in the changing step, the operation type data in the operation pattern data may be changed or the change may be canceled partially or entirely, and the displaying step may perform display control and the evaluating step may perform evaluation. Alternatively, in response to the instruction made in the changing step, the displaying step may have the display section display the operation timings and the types defined by the operation pattern data in a different tempo.

In this case, in response to the instruction made in the changing step corresponding to the evaluation being poor, the displaying step can skip the operation type data and has the display section provide a display, and the evaluating step can evaluate only the correlation between the operation timings of the operation switches operated by the player and the operation timings defined by the operation pattern data. Alternatively, in response to the instruction made in the changing step corresponding to the evaluation being poor, the displaying step can change the operation type data defining a specific type of the operation switches to data of any other type of the operation switches which are easier for the user to successfully operate and can have the display section provide a display, and the evaluating step evaluates the correlation between the operation timings and the types of the operation switches operated by the player and the operation timings defined by the operation pattern data and the types of the changed operation switches.

Alternatively, in the case where the operation type data defines that a plurality of types of operation switches are to be operated simultaneously and in response to the instruction made in the changing step corresponding to the evaluation being poor, the displaying step and the evaluating step can perform display and evaluation, respectively, of data relating at least to one type of the operation switches out of the plurality of types of the operation switches to be operated simultaneously is skipped.

The generating step may be so set as to always generate the presentation effect corresponding to the types of the operation switches defined by the operation pattern data irrespective of the instruction made in the changing step.

When the operation timings and types of the operation switches operated by the player coincide with the operation timings and types defined by the operation pattern data, an exemplary embodiment may further comprise a step of increasing a game score and differing the increase of the game score according to the difficulty level.

The evaluating step may be so set as to evaluate a coincidence between the operation timings defined by the operation pattern data and the operation timings of the operation switches operated by the player based on a predetermined allowable range extending from the operation timings defined by the operation pattern data. At this time, the allowable range may be differed based on the difficulty level.

By installing such a program into a game machine exemplified by a computer for exection, the game machine of the first aspect which produces the above effects can be realized.

These and other objects, features, aspects and advantages of the exemplary nonlimiting embodiments will become more apparent from the following detailed description of the exemplary nonlimiting embodiments when taken in conjunction with the accompanying drawings.

BRIEF DESCRIPTION OF THE DRAWINGS

FIG. 12 shows an exemplary case where the game machine 1 of the present embodiment is not a music game but others.

DESCRIPTION OF THE EXEMPLARY NONLIMITING EMBODIMENTS

Figure 1:
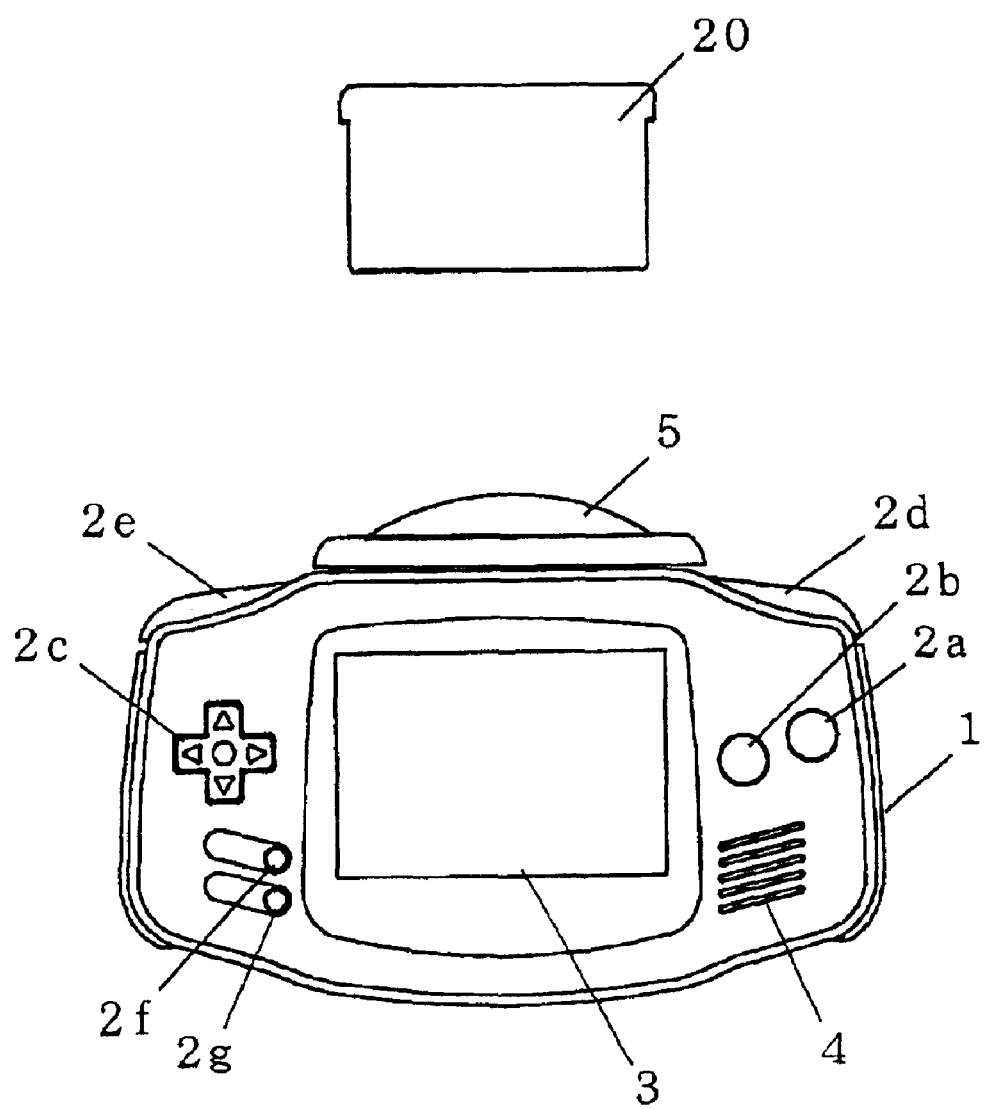
FIG. 1 is an outer view of a game machine 1 according to one exemplary nonlimiting embodiment.

FIG. 1 is an outer view of a game machine 1 according to one exemplary nonlimiting embodiment. In the present exemplary nonlimiting embodiment, a portable game machine is shown in FIG. 1, but the game machine is not limited in type, and may be a stay-at-home type.

The game machine 1 is provided with operation switches 2 (a A button 2a, a B button 2b, a cross key 2c, an R switch 2d, an L switch 2e, a start switch 2f, a select switch 2g) for a player to input game operation therethrough, a display section 3 exemplified by an LCD for displaying the game contents on its screen, a speaker 4 for sound output, an infrared transmission/reception section 5, and the like. Among the operation switches 2, the A button 2a, the B button 2b, the cross key 2c, the R switch 2d, and the L switch 2e are used for the player's operation during the game. The start switch 2f and the select switch 2g are mainly used for starting the game or menu selection, for example, but may be used for operation during the game. In this embodiment, neither the R switch 2d nor the L switch 2e are used, but if these switches are used, the game contents can offer a wide range of variation. Here, the switches 2 and others provided in the game machine 1 are not restricted in position, type, and number to those shown in FIG. 1. The infrared transmission/reception section 5 is used for communications with other game machines as appropriate (not used in this embodiment). A game cartridge 20 is detachably connected to a connector 14 (FIG. 2) which is provided on the back side of the game machine 1.

Figure 2:
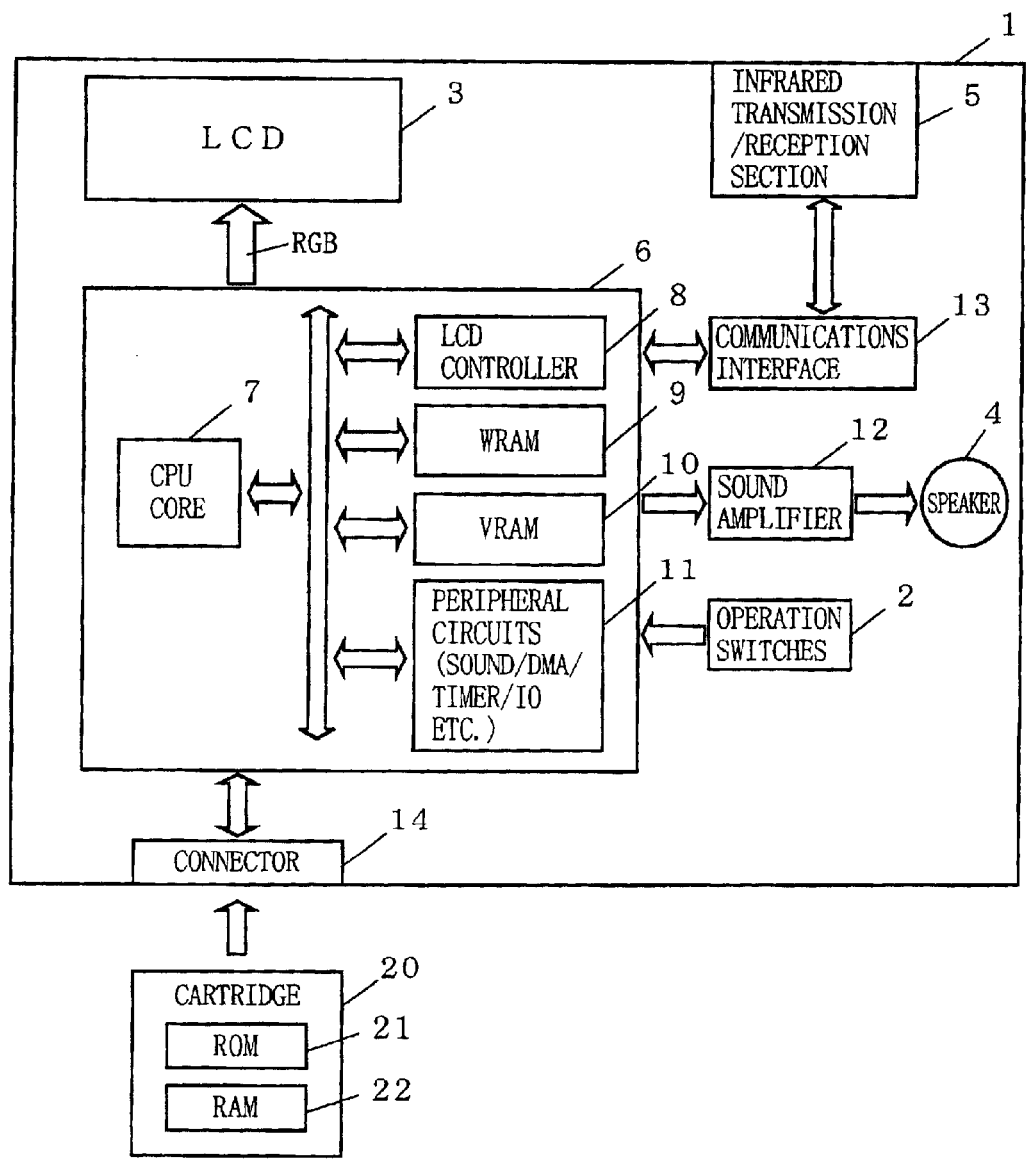
FIG. 2 is a schematic diagram showing the internal structure of the game machine 1.

FIG. 2 is a schematic diagram showing the internal structure of the game machine 1 of FIG. 1. The game machine 1 includes a control section 6. Connected to the control section 6 are the operation switches 2, the LCD (display section) 3, a sound amplifier 12, a communications interface 13, and the connector 14. To the sound amplifier 12, the speaker 4 is further connected, and to the communications interface, the infrared transmission/reception section 5 is further connected.

Based on operation data outputted from the operation switches 2, the control section 6 executes a game program which is read from the cartridge 20 via the connector 14. Then, the control section 6 outputs images and sound obtained by execution of the game program to the LCD 3 and the sound amplifier 12, respectively. If necessary, the control section 6 outputs to the communications interface 13 any data to be transmitted to other game machines, and receives from the communications interface 13 any data transmitted from other game machines.

The control section 6 includes a CPU core 7, an LCD controller 8, a WRAM 9, a VRAM 10, and peripheral circuits (e.g., SOUND/DMA/TIMER/IO) 11. The CPU core 7 executes the game program read from the cartridge 20 while using the WRAM 9 for temporary data storage. The resultant image data obtained by execution of the game program by the CPU core 7 is stored in the VRAM 10, and the resultant sound data is forwarded to the peripheral circuits 11. Based on the image data stored in the VRAM 10, the LCD controller 8 outputs images to the LCD 3. The peripheral circuits 11 output sound to the sound amplifier 12 based on the sound data outputted from the CPU core 7. The peripheral circuits 11 also perform memory access control such as DMA and timer control, for example.

The game cartridge 20 includes ROM 21 and RAM 22. In the ROM 21, the game program is non-changeably stored. In the RAM 22, game data obtained by execution of the game program is stored rewritable. It should be noted here that the game program executed in the game machine 1 may be non-changeably stored in advance in a memory of the game machine 1 which is not shown, and if this is the case, there is no need for the game cartridge 20. Alternatively, a recording medium exemplified by CDs or DVD disks may take the place of the game cartridge 20.

Next below, by referring to FIGS. 3 to 11, described is an exemplary case where the game machine 1 of this embodiment is a game machine executing a music game.

The music game described here is one by which operation information (timing and type) of the operation switches 2 needed for playing the music is displayed on the screen of the display section 3, and the music will be correctly played by the player's sequentially operating any appropriate operation switches 2 in accordance with the display. In this music game, the correctness of the music play is indicated by scores.

Figure 3:
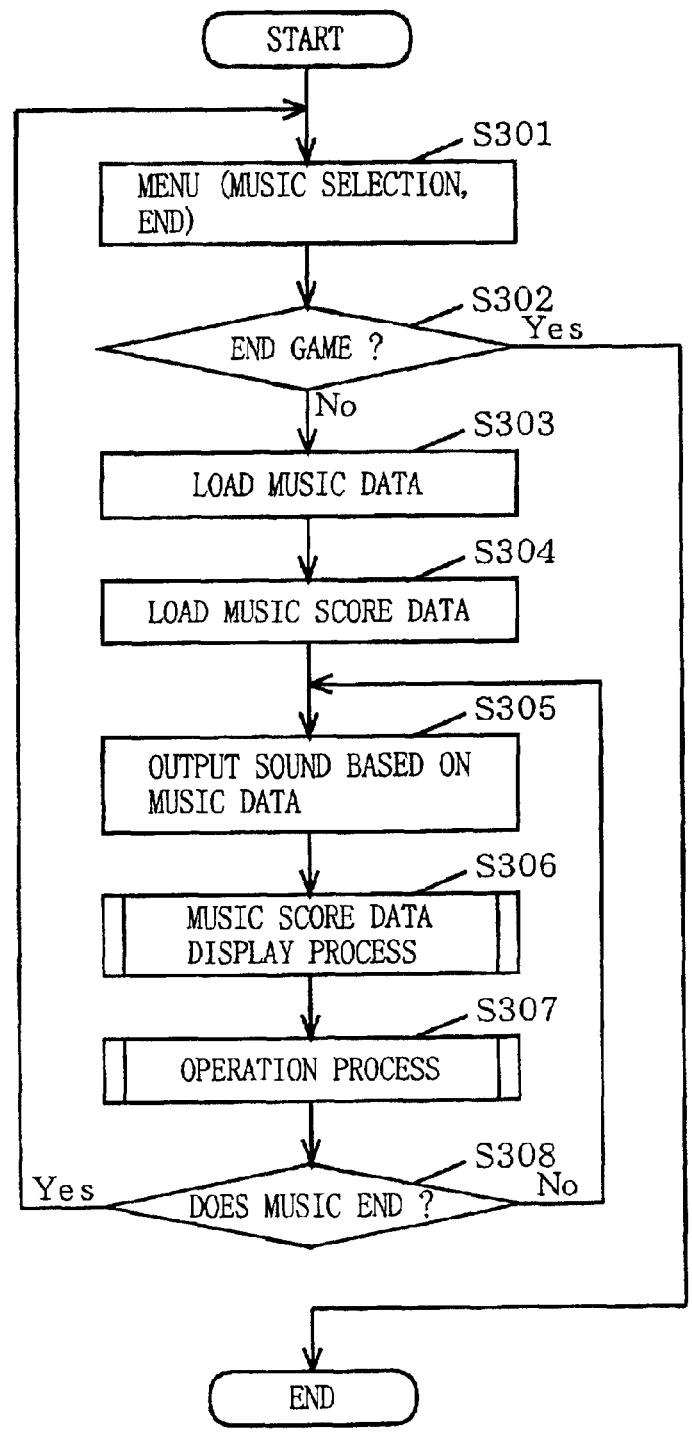
FIG. 3 is a flowchart of the basic game process applied to a music game by the game machine 1.

Referring first to the flowchart of FIG. 3, described is the game process carried out by the game machine 1.

Once the game is started, the game machine 1 allows the player to select particular music (step S310). Here, if the player selects "game end" in step S301, the game machine 1 accordingly ends the game (step S302, Yes). After a music is selected in step S301, the machine 1 first reads, from the memory, music data played as BGM in the game (including any music play except for music parts to be played by the player)(step S303). Next, the game machine 1 reads, from the memory, music score data of the music selected by the player (step S304). Such music data and music score data are previously stored in the ROM 21 in the cartridge 20.

After step S304, in steps S305 to S308, the music game corresponding to the music selected by the player is executed. First, the game machine 1 outputs, from the speaker 4, sound corresponding to the music data read in step S303, i.e., sector data which is supposed to be outputted at this time (step S305). The game machine 1 then has the music score data read in step S304 displayed on the screen of the display section 3 based on the player's difficulty level (step S306). The game machine 1 then records and analyzes, one by one, which operation switches 2 the player has operated so as to generate sound, count the score, and control any change in difficulty level (step S307). The sequence of processes in steps S305 to S307 is repeated until the music ends (step S308).

Figures 4, 5:
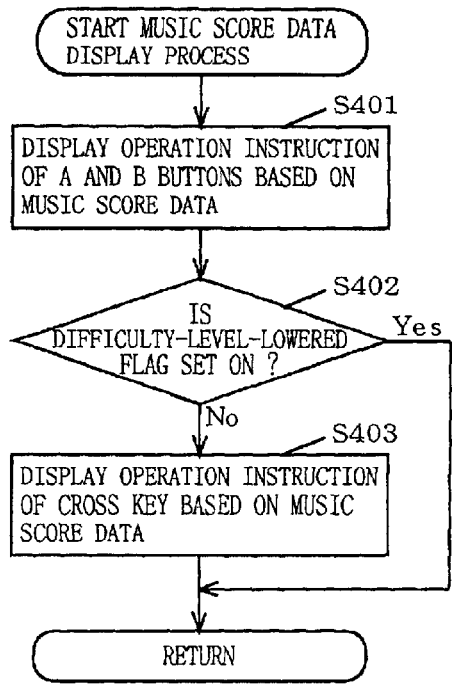
FIG. 4 is a flowchart of a music score data display process carried out in step S306 of FIG. 3.
FIG. 5 shows an example of music score data.

Referring to the flowchart of FIG. 4 next, a music score data display process carried out in step S306 of FIG. 3 is described. In this music score data display process, a process is carried out for displaying operation prompts (specifically, prompts for operation timing and type) based on the music score data. Because the A button 2a, the B button 2b, and the cross key 2c are used in the game of the present exemplary embodiment, operation prompts as to these operation switches 2 are displayed. Here, when the difficulty level is lowered, no display is made relating to the cross key 2c. Display relating to the A button 2a and the B button 2b is always made.

Referring to FIG. 4, the game machine 1 first performs display relating to the operation of the A button 2a and the B button 2b (step S401). Then, the game machine 1 determines whether a difficulty-level-lowered flag is set ON or OFF (step S402). This difficulty-level-lowered flag is a flag set according to any operation determined as being erroneous in an operation process, which will be described later, and its initial state immediately after the game start is OFF. If the difficulty-level-lowered flag is set OFF, the game machine 1 further performs display relating to the operation of the cross key 2c (step S403), and if set ON, performs no such display.

In the music score data display process, the ON/OFF status of the difficulty-level-lowered flag is used as the basis for determining whether the operation relating only to the A button 2a and the B button 2b is to be displayed, or the operation relating to the cross key 2c is to be displayed in addition to the operation of the A button 2a and the B button 2b.

In the above example, when the difficulty-level-lowered flag is set ON, the operation relating only to the A button 2a and the B button 2b is displayed. Here, if the operation contents of the cross key 2c are controlled so that operation of this key is not to be processed in the operation process (which will be described later), the operation relating to the cross key 2c may still be displayed on the screen. Under such control, the player will not notice that his/her difficulty level has been lowered so that the player will continue enjoying the game even if he/she is not familiar with the game operation. Alternatively, the A button 2a and the B button 2b may be so set as not to be different from each other in operation, and only the operation of the A button 2a may be displayed (in this case, the operation timing is kept as it is, and the operation timing for the B button 2b is totally replaced with the operation timing for the A button 2a). As another possibility for control, any operation switch which is difficult to press (e.g., positions far, small in size) may be changed to any operation switch which is easy to press (e.g., positions close, large in size). For example, the operation switches which are difficult to press may be the R switch 2d, the L switch 2e, the start switch 2f, and the select switch 2g.

In the above example, the difficulty-level-lowered flag immediately after the game start is presumed to be set OFF. If its initial state is set to be ON, it can be expected that the difficulty level becomes higher when the player is skilled. In other words, the increase or decrease of the difficulty level is relative.

Referring to FIG. 5 next, an example of the music score data is described.

The music score data is composed of, on a constant basis of the timing, information about the operation of the A button 2a and the B button 2b, and information about the operation of the cross key 2c. The cross key 2c is defined as being pressed together with the A button 2a and the B button 2c at the same time. As an example, with the A button 2a and the B button 2b only, the operation is limited to two variations. On the other hand, by pressing the cross key 2c together therewith, the operation will have ten variations including: button press only the A button 2a; button press only the B button 2b; button press the A button 2a simultaneously with the cross key 2c in each one of four directions; and button press the B button 2b simultaneously with the cross key 2c in each one of four directions.

In the example of FIG. 5, a timing is constantly equal to a quarter of a bar, and operation information is defined for any operation switch 2 needed for the timing. For example, with a timing number 1, information about operating only the "A button" is defined, and with a timing number 2, information about simultaneously operating the "B button" and "the lower part of the cross key" is defined. The above example is not restrictive, and the timing may be arbitrarily selected as to be one-eighth of a bar, for example.

Figure 6:
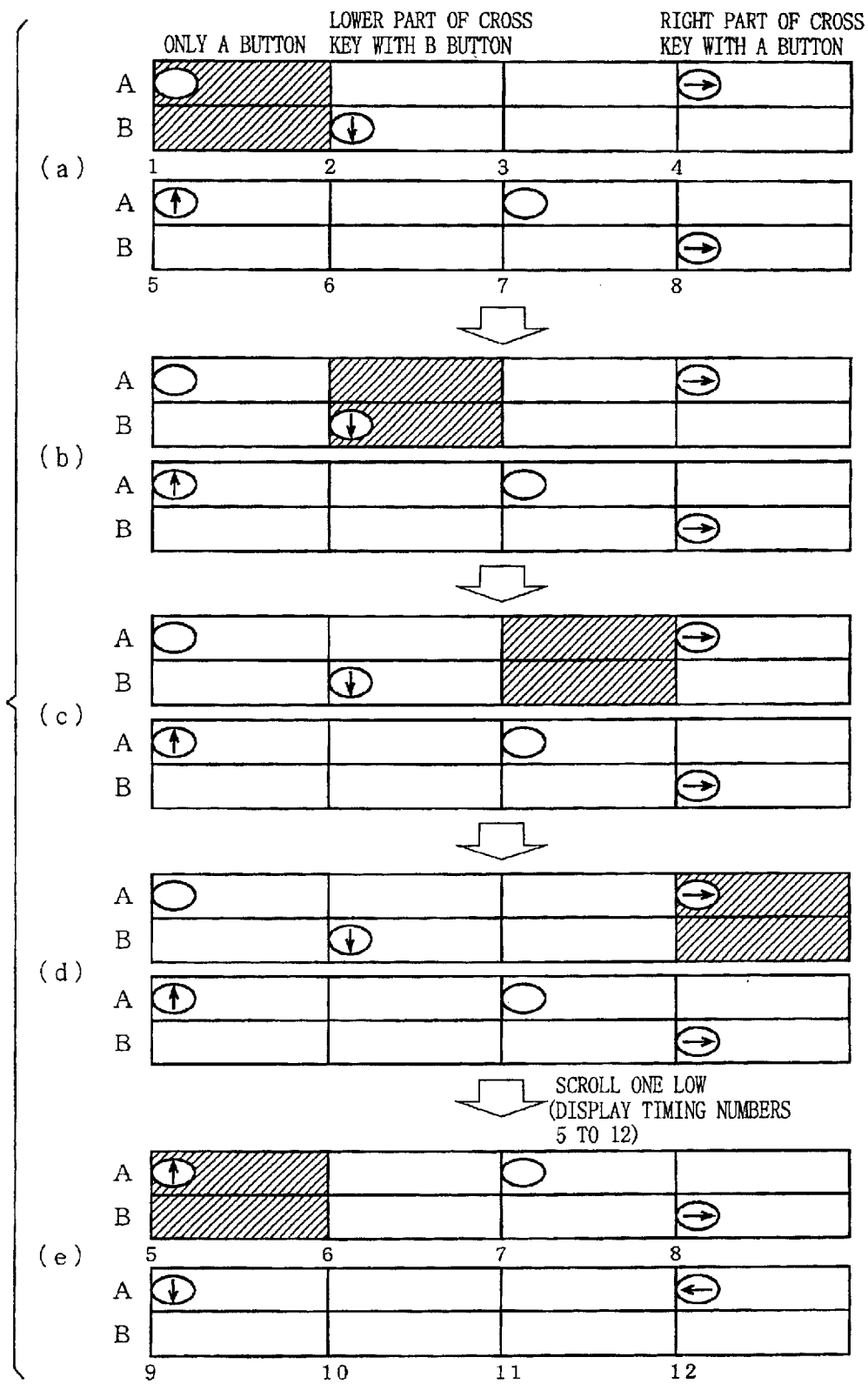
FIG. 6 shows an exemplary screen of a display section 3 having the music score data displayed thereon (difficulty level of which is general).

In the example of FIG. 6, information about operating the A button 2a, the B button 2b, and the cross key 2c on the basis of two bars is displayed on the screen. In FIG. 6, o mark is used to indicate which of the A button 2a and the B button 2b is to be operated, and thereby, the player will know that he/she is supposed to operate the button indicated by the o mark. Also, an arrow in the o mark indicates which part of the cross key 2c is supposed to be operated simultaneously with the A button 2a or the B button 2b. Herein, the diagonally shaded area indicates the timing for operating the operation switches 2. It should be noted here that the description found in the drawing (e.g., "A button only") and the timing numbers ("1" to "8") are not displayed in the actual game. The timing for operation may be indicated not by shading the corresponding area but by sound.

Once the music game is started, information about the timing number 1 is shaded to indicate the player that now is the time to operate only the "A button" ((a) of FIG. 6). After a predetermined length of time, information about the timing number 2 by shading the corresponding area is indicated next, and notifies the player to operate the "B button" and the "lower part of the cross key" at the same time ((b) of FIG. 6). Thereafter, such a display is continuously provided in the similar manner until the music score data reaches its last timing number.

Here, the screen of the display section 3 is limited in space to accommodate the music score data in one display. Thus, after a bar is through operation, the data may be scrolled on the screen to display the next bar and onward, for example ((e) of FIG. 6).

Figure 7:
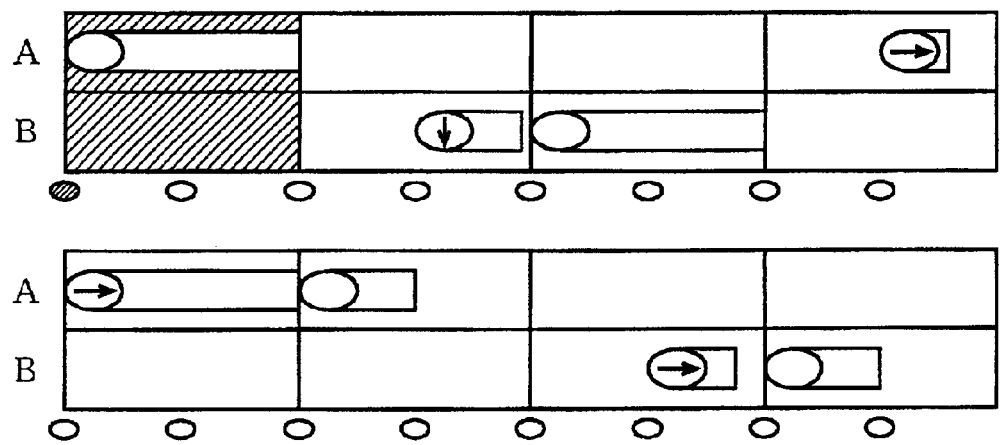
FIG. 7 shows another exemplary screen of the display section 3 having the music score data displayed thereon.

In the music score data, when the operation information defines a timing as being one-eighth of a bar, display will appear as shown in FIG. 7. Continuing the operation (keep pressing any applicable operation switch) maybe also indicated. In this case, a mark indicative of sound length may be added to indicate the timing when to release the operation switch (FIG. 7).

Figure 8:
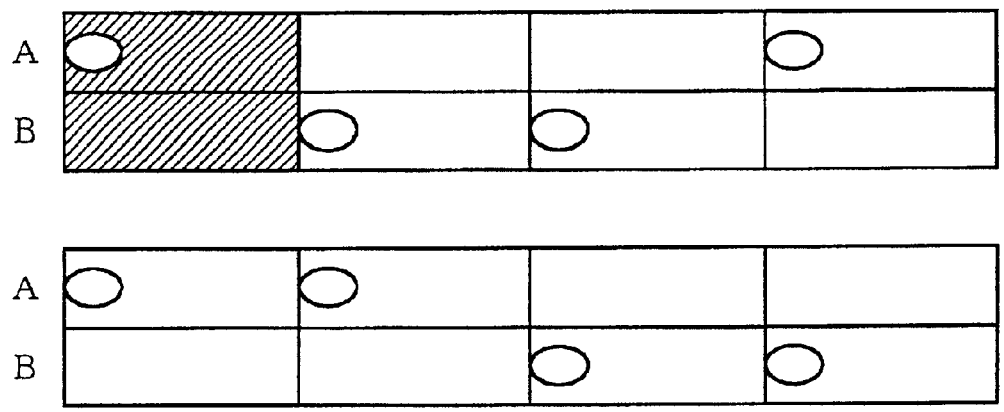
FIG. 8 shows an exemplary screen of the display section 3 having the music score data displayed thereon (difficulty level of which is lowered).

In the case where displayed is the general type of music score data as FIG. 6, if the difficulty-level-lowered flag is set ON due to the player's erroneous button press, the game machine 1 stops displaying the information relating to the operation of the cross key 2c among the operation switches 2 (FIG. 8, the difficulty level is lowered). In this manner, the player can continue playing the music till the end with a simpler input operation after the change (operating only the A button 2a and the B button 2b).

Here, when the difficulty-level-lowered flag is set ON, the information currently displayed relating to the operation of the cross key 2c may be immediately stopped from being displayed. Alternatively, as to the cross key 2c, information about the following bars to be newly displayed through scrolling may be stopped from being displayed. In this manner, the difficulty level can be lowered without causing the player to feel odd (without being noticed by the player).

Techniques for changing the difficulty level other than the above example may include, for example, increasing or decreasing the number of bars to be displayed in the screen, increasing or decreasing the music score data in size for display, or changing the music in tempo. Alternatively, any predetermined character may appear on the screen to disturb the player to check the display, or shading may not be provided any more to indicate the operation timing.

Figure 9:
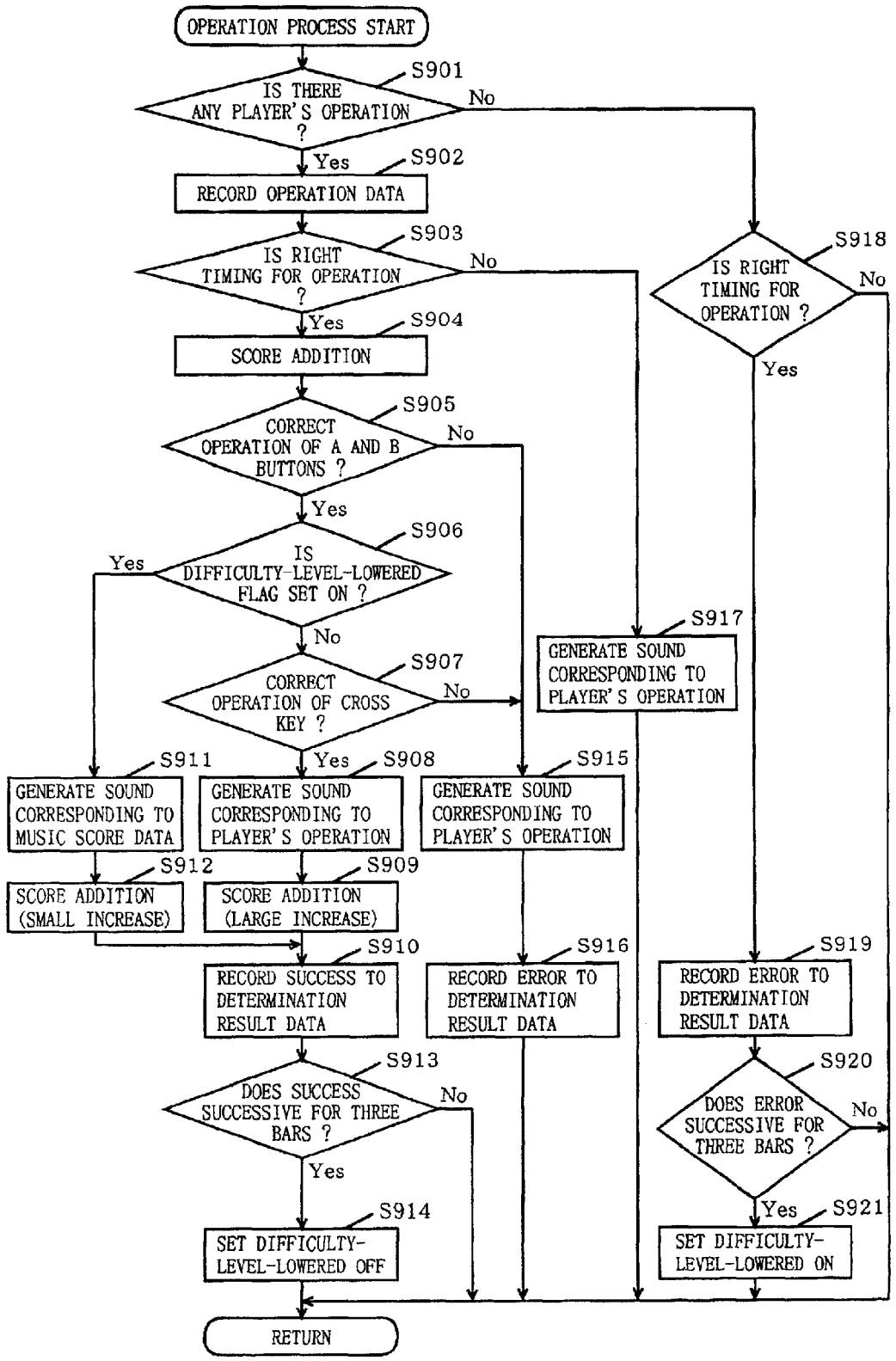
FIG. 9 is a flowchart of an operation process carried out in step S307 of FIG. 3.

Referring to the flowchart of FIG. 9, is the operation process carried out in step S307 of FIG. 3 is described next.

After displaying the music score data on the screen of the display section 3 with the music score data display process gone through (step S306 of FIG. 3), the game machine 1 determines whether the player has made any input through the operation switches 2 (step S901). If there is any input made through the operation switches 2, the game machine 1 records, on a predetermined memory, the inputted operation contents as operation data (step S902), and then determines whether the timing with which the operation switches have been operated is the same as the timing which is defined and indicated by the music score data for operation (step S903). If a determination is made that the timing for operation is not right ("NO" in step S903), the game machine 1 generates a sound (or a phrase) corresponding to any operation switch 2 operated by the player (step S917), and ends this operation process. On the other hand, if a determination is made that the time for operation in step S903 is right ("YES" in step S903), the game machine 1 increases the score of the game. That is, some points are added to the current score corresponding to the coincidence of the timing (step S904).

After addition is made to the game score, the game machine 1 refers to the recorded operation data so as to determine whether the operation switches 2, i.e., A button 2a and the B button 2b have been correctly operated as defined and indicated by the music score data (step S905). Here, if a determination is made that the operation has been correct, the game machine 1 checks ON/OFF of the difficulty-level-lowered flag (step S906). When the difficulty-level-lowered flag is set OFF, the recorded operation data is referred to for further determining whether the operation switches 2, i.e., the cross key 2c has been correctly operated as defined and indicated by the music score data (step S907). On the other hand, if the difficulty-level-lowered flag is set ON, without paying any attention to the operation of the cross key 2c, the game machine 1 generates a sound (or a phrase) corresponding to the music score data (corresponding to the types of the operation switches 2 defined in the music score data) (step S911). Then, the score of the game is increased. That is, some points for the lowered difficulty level are added to the current score corresponding to the coincidence of the operation switch 2 by type (step S912).

If a determination is made in step S907 that the operation of the cross key 2c has been correct, the game machine 1 generates a sound (or a phrase) corresponding to the type of the operation switch 2 operated by the player (step S908). Then, the score of the game is increased. That is, some points for the general difficulty level are added to the current score corresponding to the coincidence of the operation switch 2 by type (step S909). Here, if the score addition with the general difficulty level in step S909 is set higher than the score addition with the lowered difficulty level in step S912, the player's skill (the difficulty level) will differ the score even if the same music is played.

After the score addition in steps S909 and S912, the game machine 1 records "success" to determination result data (step S910). The game machine 1 then determines whether the recorded "correct" successively appears in the determination result data for a predetermined number of bars (three bars in this example) (step S913), and only when the recordation of "correct" successively appears, sets the difficulty-level-lowered flag to OFF (step S914), and ends this operation process.

If it is determined in step S905 that the A button 2a and the B button 2b have not been correctly operated, or if it is determined in step S907 that the cross key 2c has not been correctly operated, the game machine 1 generates a sound (or a phrase) corresponding to any operation switch 2 operated by the player (step S915), and then records "error" to the determination result data (step S916). This is the end of the operation process.

On the other hand, if it is determined that there has been no input made through the operation switches by the player in step S901, the game machine 1 determines whether now is supposedly the time to operate the operation switches 2 (step S918). Here if it is determined that now is the time to operate, the game machine 1 records "error" to the determination result data (step S919). If it is determined that now is not the time to operate, on the other hand, this is the end of the operation process. The game machine 1 then determines whether the recorded "error" successively appears in the determination result data for a predetermined number of bars (three bars in this example)(step S920), and only when the recordation of "error" successively appears, sets the difficulty-level-lowered flag to ON (step S921), and ends the operation process.

Figure 10:
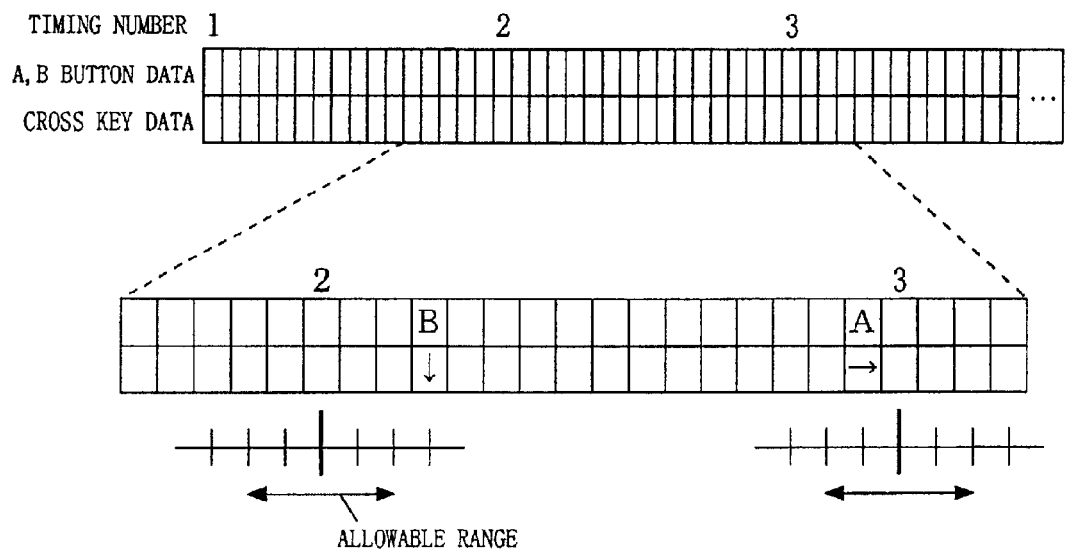
FIG. 10 shows an example of operation data.

Referring to FIG. 10, described next is an example of the operation data recorded in step S902 of FIG. 9.

FIG. 10 is a conceptual diagram showing regions to which the operation data is recorded, and a predetermined number of regions (16 regions in this example) are provided for each of the timing numbers of the music score data. Such regions each have a correlation with the passage of time in the music score data, and the operation contents inputted by the player are recorded as the operation data into the region corresponding to the input time (relative time from the music start). Here, the regions each assigned with the timing number in the drawing are the operation timings considered most preferable for each corresponding operation switch 2 for the time. The example of FIG. 10 shows that the player's operation input was behind the timing by three regions from the timing number 2, and ahead the timing by one region from the timing number 3.

Described next is a determination method executed in steps S903, S905, S907, and S918 of FIG. 9 by using this operation data.

Prior to going through steps S903 and S918, the game machine 1 sets an allowable range in terms of time lag of the operation timings. Assume here that the range is set so as to allow any time lag for two regions preceding and subsequent to a region to which the timing considered most preferable is assigned. In the processing in steps S903 and S918, based on whether the recording position of the operation data falls within this allowable region, it is determined whether the timing is right or not. By taking the operation data shown in FIG. 10 as an example, the operation timing inputted responsively to the timing number 3 is processed as the timing being right since it is within the allowable range (step S904). On the other hand, the operation timing inputted responsively to the timing number 2 is processed as the timing being not right since it is not within the allowable range (step S917). Here, for the case where the difficulty level is lowered, the allowable range may be widened to be favorable for determining the timing coincidence.

In the process of step S905, the coincidence of the button type is checked. That is, whether the A button 2a and the B button 2b in the operation data show coincidence with the A button 2a and the B button 2b defined and indicated by the music score data for operation is checked.

Similarly, in the process of step S907, the coincidence of the pressed part of the cross key 2c is checked. That is, whether the pressed part of the cross key 2c in the operation data shows coincidence with the part of the cross key 2c defined and indicated by the music score data for operation is checked.

Figure 11:
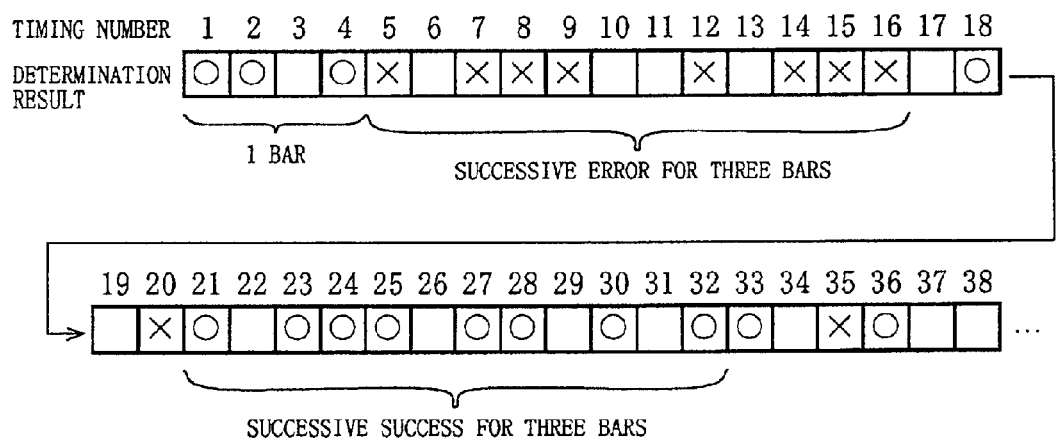
FIG. 11 illustrates an example of determination result data.

Referring next to FIG. 11, described next is an example of the determination result data recorded in steps S910, S916, and S919 of FIG. 9.

FIG. 11 is a conceptual illustration showing the regions to which the determination result data is recorded, and those regions are provided respectively corresponding to the timing numbers of the music score data. As shown in FIG. 11, when the determination result data to be recorded indicates "success," an o mark is recorded to the region to which the corresponding timing number has been assigned, and when the determination result data to be recorded indicates "error" an x mark is recorded to the region to which the corresponding timing number has been assigned.

A determination method executed in steps S913, and S920 of FIG. 9 by using this determination result data is described next.

In the determination process of step S913, whether the determination result data indicating the o mark successively appears for a predetermined number of bars is checked. In the determination process of step S920, on the other hand, whether the determination result data indicating the x mark successively appears for a predetermined number of bars is checked. If the predetermined number of bars is three, 12 pieces of determination result data in terms of timing number is checked. In the example of FIG. 11, the timing numbers 5 to 16 are regarded as successive errors, and the timing numbers 21 to 32 are regarded as successive successes.

Lastly, referring to FIG. 12, the case where the game machine 1 is a game machine executing a non-music game is described. FIG. 12 shows the game machine 1 executing a whack-a-mole game. This game is a game of whacking a mole hopping out of several holes. The player uses the cross key 2c together with the A button 2a or the B button 2b to designate which hole to whack ((b) of FIG. 12). In order to apply the above described technique to such a game, the required operation for the general difficulty level may be (b) of FIG. 12. Once the difficulty level is lowered, the operation may be limited to use only the A button 2a and the B button 2b as shown in (c) of the same drawing, or only the A button 2a as shown in (d) of the same drawing.

That is, for the general difficulty level of (b) of FIG. 12, responding to the hole out of which the mole hops, the A button 2a, the B button 2b, and the cross key 2c are all to be operated to designate which of the ten holes to whack. When the difficulty level is lowered as (c) of FIG. 12, the A button 2a may be operated when the mole hops out of the five holes located on the left, and the B button 2b may be operated when the mole hops out of the other five holes located on the right. If the difficulty level is lowered to (d) of FIG. 12, the A button 2a may be always operated no matter which hole the mole hops out (there only needs to coincide the operation timing).

As described above, in the game machine of one embodiment, the difficulty level of the game operation input can be changed in the middle of the game depending on the actual skill level of the player. Especially, by automatically lowering the difficulty level, the player can enjoy the game till the end even if he/she is not competent enough, and thus he/she can become skilled in a step by step manner.

Furthermore, the player has no need to set his/her difficulty level so that the difficulty level can be always automatically changed to be appropriate even if he/she is not recognizing his/her actual level.

Moreover, with the low difficulty level, the operation (operation timing) remains as it is so that the operation timing does not differ between the general difficulty level (or high difficulty level) and the low difficulty level. Therefore, the player can learn the operation timing with the low difficulty level, and be ready for the general difficulty level (or high difficulty level). That is, the player first learns the operation timing, and then learn what type of operation switches he/she is supposed to operate. As such, the player can learn how to play the music step by step.

While the exemplary embodiments have been described in detail, the foregoing description is in all aspects illustrative and not restrictive. It is understood that numerous other modifications and variations can be devised without departing from the scope of the invention.

What is claimed is:

1. A game machine for executing a predetermined game in response to a player's operation, comprising:
    a display that displays a game screen;
    operation switches operated by the player;
    an operation pattern data storage memory that stores operation pattern data including operation timing data defining an operation timing of said operation switches to be operated by the player, and operation type data defining which type of said operation switches is to be operated with the operation timing;
    a display controller that controls said display to sequentially display, based on said operation pattern data, information about the operation timings and the types of said operation switches to be operated by the player;
    an evaluation section that successively evaluates, with the progress of the game, correlation between the operation timings and types of said operation switches operated by the player responding to the information displayed on said display, and the operation timings and types defined by said operation pattern data; and
    difficulty level change section that, in response to a difficulty level having been set low, skips or changes at least a portion of said operation type data without skipping or changing said operation timing data, and controls said display controller to perform display control and said evaluation section to perform evaluation.

2. The game machine according to claim 1, further comprising:
    music data storage memory that stores music data;
    music data reproduction section that reproduces said music data; and
    presentation effect generator that generates a predetermined presentation effect responding to how said operation switches are operated, wherein
    said operation pattern data storage memory previously stores, corresponding to said music data, the operation pattern data defining which type of said operation switches is to be operated by the player with what timing, and
    said display controller has said display sequentially display the information about the operation timings and the types of said operation switches to be operated by the player responding to said music data reproduced by said music data reproduction section.

3. The game machine according to claim 2, wherein said presentation effect generator always generates the presentation effect corresponding to the types of said operation switches defined by said operation pattern data irrespective of the control by said difficulty level change section.

4. The game machine according to claim 1, wherein said difficulty level change section controls said display controller to have said display display said operation timings and the types defined by said operation pattern data in a different tempo.

5. The game machine according to claim 1, wherein said difficulty level change section skips said operation type data in response to said evaluation being poor, controls said display controller to have said display to perform a display, and controls said evaluation section to perform evaluation only in terms of the correlation between the operation timings of said operation switches operated by the player and the operation timings defined by said operation pattern data.

6. The game machine according to claim 1, wherein responding to said evaluation being poor, said difficulty level change section changes said operation type data defining a specific type of said operation switches to data of any other type of the operation switches which is easier in operation, controls said display controller to have said display to perform a display, and controls said evaluation section to evaluate the correlation between the operation timings and the types of said operation switches operated by the player and the operation timings defined by said operation pattern data and the types of the changed operation switches.

7. The game machine according to claim 1, wherein said operation type data defines that a plurality of types of said operation switches are operated simultaneously, and
responding to said evaluation being poor, said difficulty level change section skips the data relating at least to one type of said operation switches out of the plurality of types of said operation switches to be operated simultaneously, and controls said display controller to perform a display and said evaluation section to perform evaluation.

8. The game machine according to claim 1, wherein when the operation timings and types of said operation switches operated by the player coincide with the operation timings and types defined by said operation pattern data, said evaluation section increases a game score, and differs the increase of the game score according to the difficulty level.

9. The game machine according to claim 1, wherein said evaluation section evaluates a coincidence between the operation timings defined by said operation pattern data and the operation timings of said operation switches operated by the player based on a predetermined allowable range extending from the operation timings defined by said operation pattern data.

10. The game machine according to claim 9, wherein said allowable range is differed based on the difficulty level.

11. A program for controlling a game executed in a game machine, comprising:

a step of reading predetermined operation pattern data including operation timing data defining an operation timing of operation switches to be operated by a player, and operation type data defining which type of the operation switches is to be operated with the operation timing;

a step of having a display of the game machine sequentially display, based on said operation pattern data, information about the operation timings and the types of said operation switches to be operated by the player;

a step of successively evaluating, with the progress of the game, a correlation between the operation timings and types of said operation switches operated by the player responding to the information displayed on said display, and the operation timings and types defined by said operation pattern data;

in response to a difficulty level having been set low, a step of skipping or changing at least a portion of said operation type data without skipping or changing said operation timing data;

in accordance with said step of skipping or changing, a step of having said display of the game machine display information about the operation timings and the types of said operation switches to be overated by the player; and a step of evaluating a correlation between the operation timings and types of said operation switches operated by the player responding to the information displayed on said display, and the operation timings and types defined by said operation pattern data.

12. The program according to claim 11, wherein in response to an instruction made in said changing step corresponding to said evaluation being poor, said displaying step skips said operation type data, and said evaluating step evaluates only in terms of the correlation between the operation timings of said operation switches operated by the player and the operation timings defined by said operation pattern data.

13. The program according to claim 11, wherein in response to an instruction made in said changing step corresponding to said evaluation being poor, said displaying step changes said operation type data defining a specific type of the operation switches to data of any other type of the operation switches which is easier in operation, and said evaluating step evaluates the correlation between the operation timings and the types of said operation switches operated by the player and the operation timings defined by said operation pattern data and the types of the changed operation switches.

14. The program according to claim 11, wherein said operation type data defines that a plurality of types of said operation switches are operated simultaneously, and in response to an instruction made in said changing step corresponding to said evaluation being poor, the data relating at least to one type of said operation switches out of the plurality of types of said operation switches to be operated simultaneously is skipped, said displaying step performs display, and said evaluating step performs evaluation.

15. The program according to claim 11, further comprising a step of, when the operation timings and types of said operation switches operated by the player coincide with the operation timings and types defined by said operation pattern data, increasing a game score and differing the increase of the game score according to the difficulty level.

16. The program according to claim 11, wherein said evaluating step evaluates a coincidence between the operation timings defined by said operation pattern data and the operation timings of said operation switches operated by the player based on a predetermined allowable range extending from the operation timings defined by said operation pattern data.

17. The program according to claim 16, wherein said allowable range is differed based on the difficulty level.

18. A program of a music game executed by a game machine, comprising:

a step of reading predetermined music data;

a step of reproducing said music data;

a step of generating a predetermined presentation effect responding to a player's operation of operation switches;

a step of reading predetermined operation pattern data including, corresponding to said music data, operation timing data defining an operation timing of operation switches to be operated by the player, and operation type data defining which type of the operation switches is to be operated with the operation timing;

a step of having a display of the game machine sequentially display, based on said operation pattern data, information about the operation timings and the types of said operation switches to be operated by the player corresponding to reproduction of said music data;

a step of successively evaluating, with the progress of the game, a correlation between the operation timings and types of said operation switches operated by the player responding to the information displayed on said display, and the operation timings and types defined by said operation pattern data;

in response to a difficulty level having been set low, a step of skipping or changing at least a portion of said operation type data without skipping or changing said operation timing data;

in accordance with said step of skipping or changing, a step of having said display of the game machine display information about the operation timings and the types of said operation switches to be operated by the player; and a step of evaluating a correlation between the operation timings and types of said operation switches operated by the player responding to the information displayed on said display, and the operation timings and types defined by said operation pattern data.

19. The program according to claim 11, wherein in response to an instruction made in said changing step, said displaying step has said display said operation timings and the types defined by said operation pattern data in a different tempo.

20. The program according to claim 18, wherein said generating step always generates the presentation effect corresponding to the types of said operation switches defined by said operation pattern data irrespective of the instruction made in said changing step.

21. In a software-controlled video game machine of the type including a plurality of user-operated switches, a method of automatically changing a difficulty level of a game during game execution, the method comprising:

displaying information relating to designated operation timings and types of switches to be operated by a user;

receiving information relating to actual operation timings and types of switches operated by the user;

comparing the information relating to the designated operation timings and types of switches to be operated by the user and the information relating to the actual operation timings and types of switches operated by the user; and automatically changing the difficulty level of the game during game execution based on the comparison by changing the information relating to the types of switches to be operated by the user but without changing the information relating to the operation timing of the switches to be operated by the user.

22. The method of claim 21 wherein the difficulty level of the game is automatically changed to a less difficult level based on the comparison by decreasing the number of types of switches in the displayed information without changing the information relating to the operation timings of the switches to be operated by the user.

23. The method of claim 21 wherein the difficulty level of the game is automatically changed to a more difficult level based on the comparison by increasing the number of types of switches in the displayed information without changing the information relating to the operation timings of the switches to be operated by the user.

24. In a software-controlled video game machine of the type including a plurality of user-operated switches, a method comprising:

displaying information relating to designated operation timings and types of switches to be operated by a user, the number of different types of switches being equal to a certain number;

receiving information relating to actual operation timings and types of switches operated by the user;

comparing the information relating to the designated operation timings and types of switches to be operated by the user and the information relating to the actual operation timings and types of switches operated by the user; and automatically changing the display of information relating to designated operation timings and types of switches to be operated by a user based on the comparison by changing the number of the different types of switches so that the number of the different types of switches displayed is no longer equal to the certain number, but without changing the information relating to the operation timings of the switches to be operated.

25. A video game machine comprising:

a display;

a plurality of user operable switches;

a memory that stores information relating to designated operation timings and types of switches to be operated by a user during game execution, the information being displayed on the display; and a processor that receives information relating to actual operation timings and types of switches operated by the user, compares the information relating to the designated operation timings and types of switches with the information relating to the actual operation timings and types of switches operated by the user, and automatically changes the difficulty level of a game during game execution based on the comparison by changing the information relating to the types of switches to be operated by the user but without changing the information relating to the operation timings of the switch operation.

26. The machine of claim 25 wherein the processor automatically changes the difficulty level of the game to a less difficult level based on the comparison by decreasing the number of types switches in the information being displayed on the display without changing the information relating to the operation timings of the switch operation.

27. The machine claim of 25 wherein the processor automatically changes the difficulty level of the game to a more difficult level based on the comparison by increasing the number of types switches in the information being displayed on the display without changing the information relating to the operation timings of the switch operation.

* * * * *